United States Patent
Gattegno et al.

(10) Patent No.: US 10,613,988 B2
(45) Date of Patent: Apr. 7, 2020

(54) PURGING STORAGE PARTITIONS OF DATABASES

(71) Applicant: HEWLETT PACKARD ENTERPRISE DEVELOPMENT LP, Houston, TX (US)

(72) Inventors: Keren Gattegno, Yehud (IL); Eli Revach, Yehud (IL); Fernando Vizer, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 454 days.

(21) Appl. No.: 15/278,977

(22) Filed: Sep. 28, 2016

(65) Prior Publication Data

US 2018/0089239 A1    Mar. 29, 2018

(51) Int. Cl.
*G06F 7/00* (2006.01)
*G06F 12/0875* (2016.01)
*G06F 16/22* (2019.01)

(52) U.S. Cl.
CPC ........ *G06F 12/0875* (2013.01); *G06F 16/221* (2019.01); *G06F 2212/60* (2013.01)

(58) Field of Classification Search
CPC ....... G06F 17/30309; G06F 17/303345; G06F 12/0875; G06F 17/30575; G06F 2212/60; G06F 3/0644; G06F 9/46; G06F 9/5077
USPC ........................................ 707/634, 638, 695
See application file for complete search history.

(56) References Cited

U.S. PATENT DOCUMENTS

| | | | | |
|---|---|---|---|---|
| 5,721,915 A | * | 2/1998 | Sockut | G06F 17/30339 |
| 6,185,666 B1 | * | 2/2001 | Murray | G06F 3/0607 |
| | | | | 711/173 |
| 6,434,678 B1 | * | 8/2002 | Menzel | G06F 3/0608 |
| | | | | 711/156 |
| 6,920,555 B1 | * | 7/2005 | Peters | G06F 9/4451 |
| | | | | 711/173 |
| 7,624,120 B2 | * | 11/2009 | Pawar | G06F 17/30339 |
| 8,504,524 B1 | * | 8/2013 | Chatterjee | G06F 16/128 |
| | | | | 707/639 |
| 8,805,784 B2 | * | 8/2014 | Novik | G06F 17/30566 |
| | | | | 707/633 |
| 8,832,045 B2 | | 9/2014 | Dodd et al. | |
| 8,874,562 B2 | | 10/2014 | Yennie | |
| 9,251,485 B2 | | 2/2016 | Kolesnikov | |
| 9,275,097 B2 | | 3/2016 | DeLaFranier et al. | |
| 9,965,497 B2 | * | 5/2018 | Raghavan | G06F 17/303 |
| 2003/0220938 A1 | * | 11/2003 | Norcott | G06F 17/30306 |
| 2005/0172065 A1 | * | 8/2005 | Keays | G06F 11/1068 |
| | | | | 711/103 |

(Continued)

OTHER PUBLICATIONS

Marco, D., Managed Meta Data Environment (MME): A Complete Walkthrough, The Data Administration Newsletter, TDAN. com (2004): 1-9.

*Primary Examiner* — Mohammed R Uddin

(57) ABSTRACT

Examples relate to purging storage partitions of a database. The examples disclosed herein identify a first partition of a database to be purged and identify a data entry in the first storage partition, where the data entry is to be copied. Examples herein copy an updated version of the data entry to a future storage partition of the database and purge the first storage partition. A dummy data entry is created in a second storage partition of the database, where the dummy data entry identifies the future storage partition.

20 Claims, 3 Drawing Sheets

(56) References Cited

U.S. PATENT DOCUMENTS

| | | | |
|---|---|---|---|
| 2006/0161605 A1* | 7/2006 | Terazono | G06F 8/71 |
| 2006/0206507 A1* | 9/2006 | Dahbour | G06F 17/30604 |
| 2007/0198591 A1* | 8/2007 | Teng | G06F 17/30339 |
| 2007/0245069 A1* | 10/2007 | Kikuchi | G06F 12/0246 |
| | | | 711/103 |
| 2011/0191521 A1* | 8/2011 | Araki | G06F 12/0246 |
| | | | 711/103 |
| 2013/0117515 A1* | 5/2013 | Ashmore | G06F 12/16 |
| | | | 711/162 |
| 2014/0156666 A1* | 6/2014 | Jagtiani | G06F 17/30707 |
| | | | 707/740 |
| 2014/0279855 A1* | 9/2014 | Tan | G06F 17/30345 |
| | | | 707/609 |
| 2015/0106407 A1* | 4/2015 | Adayilamuriyil | |
| | | | G06F 17/30595 |
| | | | 707/804 |
| 2015/0242451 A1* | 8/2015 | Bensberg | G06F 17/30584 |
| | | | 707/615 |
| 2015/0254285 A1* | 9/2015 | Achar | G06F 17/30303 |
| | | | 707/692 |
| 2017/0109377 A1* | 4/2017 | Baer | G06F 17/30303 |
| 2017/0277747 A1* | 9/2017 | Tremayne | G06F 17/30395 |

\* cited by examiner

PURGING STORAGE PARTITIONS OF DATABASES

BACKGROUND

A columnar database or column-oriented database management system stores data tables as columns rather than as rows. A columnar database may more precisely access needed data to answer a query rather than scanning and discarding unwanted data in rows. As a result, query performance is often increased, particularly in very large data sets.

BRIEF DESCRIPTION OF THE DRAWINGS

The following detailed description references the drawings, wherein.

DETAILED DESCRIPTION

As mentioned above, columnar databases or column-oriented database management systems store data tables as columns rather than as rows. Columnar databases may utilize use data structures such as log-structured merge-tree (LSM tree), in which database data files may not be directly updated by transactions, but in which each transaction creates its own set of small data files when data is committed. An asynchronous background process may merge these small files to a next level of bigger file sets. Therefore, many columnar databases may be highly optimized for inserting and querying data, but less efficient for high frequency updates.

Data versioning may facilitate updates in columnar databases to reflect the latest state of data records. However, frequent data versioning in big databases can lead to large database tables, which may impact query performance and overall database concurrency, leading to a potential increase in total cost of ownership (TCO) for customers. As a result, a proposed way to reduce the TCO and query performance is to reduce data sets by purging outdated data.

Database table partitioning may solve these challenges. Data table partitions allows data to be stored in separate physical locations, which in turn allows purging data of specific partitions. A specific partition can be purged when all data that was stored on that partition becomes obsolete. In many cases, the partitions are divided by time range, where each partition includes a separate time range, and the purging is performed on partitions that include data passing a predefined time threshold (e.g., a week old). However, in many instances, the number of versions of data in a database is unknown and updates to data can be sporadic. For example, a latest version of a given data pair may reside on a very old partition and should not be purged.

Examples disclosed herein provide a technical solution to this technical issue by providing for data versioning for managing high frequency updates to a database utilizing purging and caching techniques. An example enables identifying a first storage partition of a database to be purged and identifying a data entry in the first storage partition, where the data entry is to be copied. The example enables copying an updated version of the data entry to a future storage partition of the database, and purging the first storage partition. The example enables creating a dummy data entry in a second storage partition of the database, and the dummy data entry identifies the future partition. In this manner, examples herein may reduce storage sizes of databases, while maintaining latest versions of data entries stored within the database.

Figures 1A, 1B:
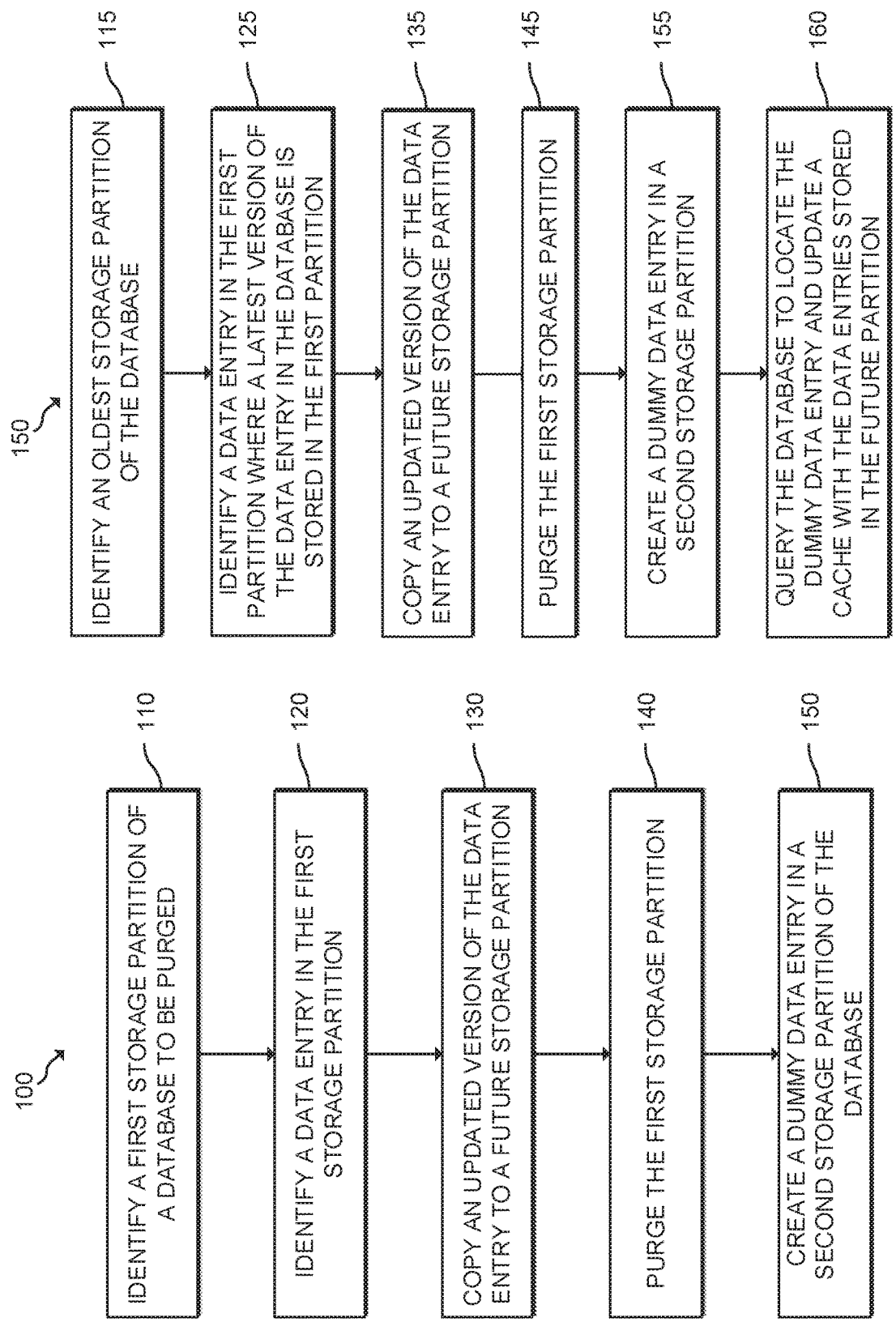
FIG. 1A is a flowchart of an example method for purging a storage partition of a database.
FIG. 1B is a flowchart of an example method for purging a storage partition of a database including updating a cache.

Referring now to the drawings, FIG. 1A illustrates a flowchart of an example method 100 for purging a storage partition of a database. The various processing blocks and/or data flows depicted in FIG. 1A are described in greater detail herein. The described processing blocks may be accomplished using some or all of the system components described in detail herein and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 100 as illustrated (and described in greater detail below) is meant be an example and, as such, should not be viewed as limiting. Method 100 may be implemented in the form of executable instructions stored on a machine-readable storage medium, such as storage medium 220 described below, and/or in the form of electronic circuitry. For example, method 100 may be implemented as part of a database management system for a computer system.

In an operation 110, a first storage partition of a database to be purged may be identified. A database may be an organized collection of data, which may include a plurality of data entries stored in the database. A database may be a collection of schema, tables, queries, reports, views, and other data objects. In some examples disclosed herein, a database may be a columnar database, which may be a database managed by a database management system (DBMS) that stores data tables as columns rather than as rows. In some examples, columnar databases may utilize use data structures such as log-structured merge-tree (LSM tree), in which database data entries may not be directly updated by transactions, but in which each transaction may create new data entries or new versions of existing date entries when data is committed.

The data of a database may be stored in one or more storage devices. Storage capacity of a database may be divided into storage partitions, which may be, for example, part of a storage device, a storage device, or multiple storage devices. A storage device may include any recording media used to retain digital data, including semiconductor-based memory, magnetic storage, optical storage, etc. A database may utilize both memory and storage, and may store data across a network of storage devices. Storage devices may be located on a computing device or distributed across multiple physical locations. In such instances, storage devices used by a database may be physically connected or linked together by a network such as a cloud, the Internet, an intranet, a PAN (Personal Area Network), a LAN (Local Area Network), a WAN (Wide Area Network), a SAN (Storage Area Network), a MAN (Metropolitan Area Network), a wireless network, and/or other network.

A first storage partition to be purged may be identified by identifying an oldest storage partition of the database. For example, a database management application may query all partitions of the database to identify the oldest storage partition in the database. The identified storage partition may be identified for purging, which is described below in relation to operations 120-150. In some examples, multiple oldest storage partitions may be identified for purging.

In an operation 120, a data entry in the first storage partition may be identified, where the data entry is to be copied. Operation 120 may, in essence, determine which data entries in the first storage partition should be copied. As described previously, each storage partition of the database, including the first storage partition, may store data entries, which may be collections of data formatted for storing in the database.

In some examples, a data entry to be copied may be identified by identifying a data entry in the database where a latest version of the data entry in the database is stored in the first storage partition. In other words, the version of a particular data entry stored in the first storage partition is the latest version of that data entry in the database. For example, to a computer system may query all data entries in the database to locate the latest versions of each data entry in the database. Those data entries which have their latest versions stored in the first storage partition may be identified for copying. In some examples, multiple data entries may be identified to be copied.

In an operation 130, an updated version of the data entry identified in operation 120 may be copied to a future storage partition of the database. For example, copying the data entry may involve inserting a new version of the data entry into the future storage partition. This allows the latest version of the data entry to continue to be stored in the database after the first storage partition has been purged. In some examples, the future partition may be an empty partition at the time the data entry is copied to it. In some examples, the future partition may be any other partition in the database.

In an operation 140, the first storage partition may be purged. After copying, in operation 130, the data entries identified in operation 120, the first storage partition may become obsolete. In other words, the first storage partition no longer stores any data entries where the latest version is stored on the first storage partition. The first storage partition may be purged by erasing all of the data stored on it. The first storage partition may then be an empty partition in the database, which may be used to store new data, and may be used as a future partition in later iterations of method 100.

In an operation 150, a dummy data entry may be created in a second storage partition of the database. In some examples, a dummy data entry may be written in a second storage partition in response to the purging of a first storage partition. A dummy data entry may include information about the destination future partition to which the data entries were copied to, such as in operation 130.

The second storage partition, in some examples, may be the second oldest storage partition of the database, and it may become the oldest storage partition of the database after the first storage partition is purged. Thus, the dummy data entry may be stored in the oldest storage partition in the database. Writing the dummy data entry to the oldest partition facilitates that the purging of the oldest partition removes an old dummy data entry and that a new dummy data entry is in the now-oldest partition. Therefore, one dummy may be present in the database.

Method 100 may be executed periodically by a database management application executed by a computing system. For example, method 100 may be executed according to a database schedule, such as every few hours to optimize efficiency of the database storage. In such a manner, database management applications implementing method 100 may reduce the total storage needed to store the most recent versions of all data entries in the database.

FIG. 1B is a flowchart of an example method 150 for purging a storage partition of a database including updating a cache. Method 150 as illustrated (and described in greater detail below) is meant be an example and, as such, should not be viewed as limiting. Method 150 may be implemented in the form of executable instructions stored on a machine-readable storage medium, such as storage medium 220 described below, and/or in the form of electronic circuitry.

In an operation 115, an oldest storage partition of a database may identified. Operation 115 may be analogous to operation 110 of method 100. For example, a database management application may query all partitions of the database to identify the oldest storage partition in the database. The identified storage partition may be identified for purging, which is described below in relation to operations 125-160. In some examples, multiple oldest storage partitions may be identified for purging.

In an operation 125, a data entry in the first partition is identified where a latest version of the data entry in the database is stored in the first partition. In other words, the version of a particular data entry stored in the first storage partition is the latest version of that data entry in the database. Operation 125 may be analogous to operation 120 of method 100. For example, all data entries in the database may be queried to locate the latest versions of each data entry in the database. Those data entries which have their latest versions stored in the first storage partition may be identified for copying. In some examples, multiple data entries may be identified to be copied.

In an operation 135, an updated version of the data entry is copied to a future storage partition. Operation 135 may be analogous to operation 130 of method 100. For example, copying the data entry may involve inserting a new version of the data entry into the future storage partition. This allows the latest version of the data entry to continue to be stored in the database after the first storage partition has been purged. In some examples, the future partition may be an empty partition at the time the data entry is copied to it. In some examples, the future partition may be any other partition in the database.

In an operation 145, the first storage partition may be purged. Operation 145 may be analogous to operation 140. For example, the first storage partition may be purged by erasing all of the data stored on it. The first storage partition may then be an empty partition in the database, which may be used to store new data, and may be used as a future partition in later iterations of method 100.

In an operation 155, a dummy data entry may be created in a second storage partition. In some examples, a dummy data entry may be written in a second storage partition in response to the purging of a first storage partition. A dummy data entry may include information about the destination future partition to which the data entries were copied to, such as in operation 135. The second storage partition, in some examples, may be the second oldest storage partition of the database, and it may become the oldest storage partition of the database after the first storage partition is purged. Thus, the dummy data entry may be stored in the oldest storage partition in the database. Writing the dummy data entry to the oldest partition facilitates that the purging of the oldest partition removes an old dummy data entry and that a new dummy data entry is in the now-oldest partition. Therefore, one dummy may be present in the database.

In an operation 160, the database may be queried to locate the dummy data entry, and a cache may be updated with the data entries stored in the future partition. A cache may be a memory that stores the latest versions of each data entry in the database. In some examples, a cache may store the actual latest versions of the data entries or it may store identifying metadata of the latest versions of the data entries. A cache may be any suitable memory or storage device. In some examples, a cache may be physically and/or operably separate from the storage partitions of the database.

In response to the copying of an updated version of a data entry from a first storage partition to a second partition, the cache may be updated to include the updated version of the data entry. In some examples, this process may not occur automatically, but may occur as part of a cache updating process. For example, periodically the cache may query the database to locate a dummy data entry, such as the one created in operation 155. Upon finding the dummy data entry, which identifies a future partition, the cache may be updated with the data entries in the future partition, which are updated versions of the data entries copied from the first storage partition, which was purged. In this manner, a cache may be maintained to keep a record of which version of each data entry is the latest (i.e., most up-to-date) within the database.

As with method 100 of FIG. 1A, method 150 may be executed periodically by a database management application executed by a computing system. For example, method 150 may be executed according to a schedule, such as every few hours to maximize efficiency of the database storage. In such a manner, database management applications implementing method 150 may reduce the total storage needed to store the most recent versions of all data entries in the database.

Figure 2:
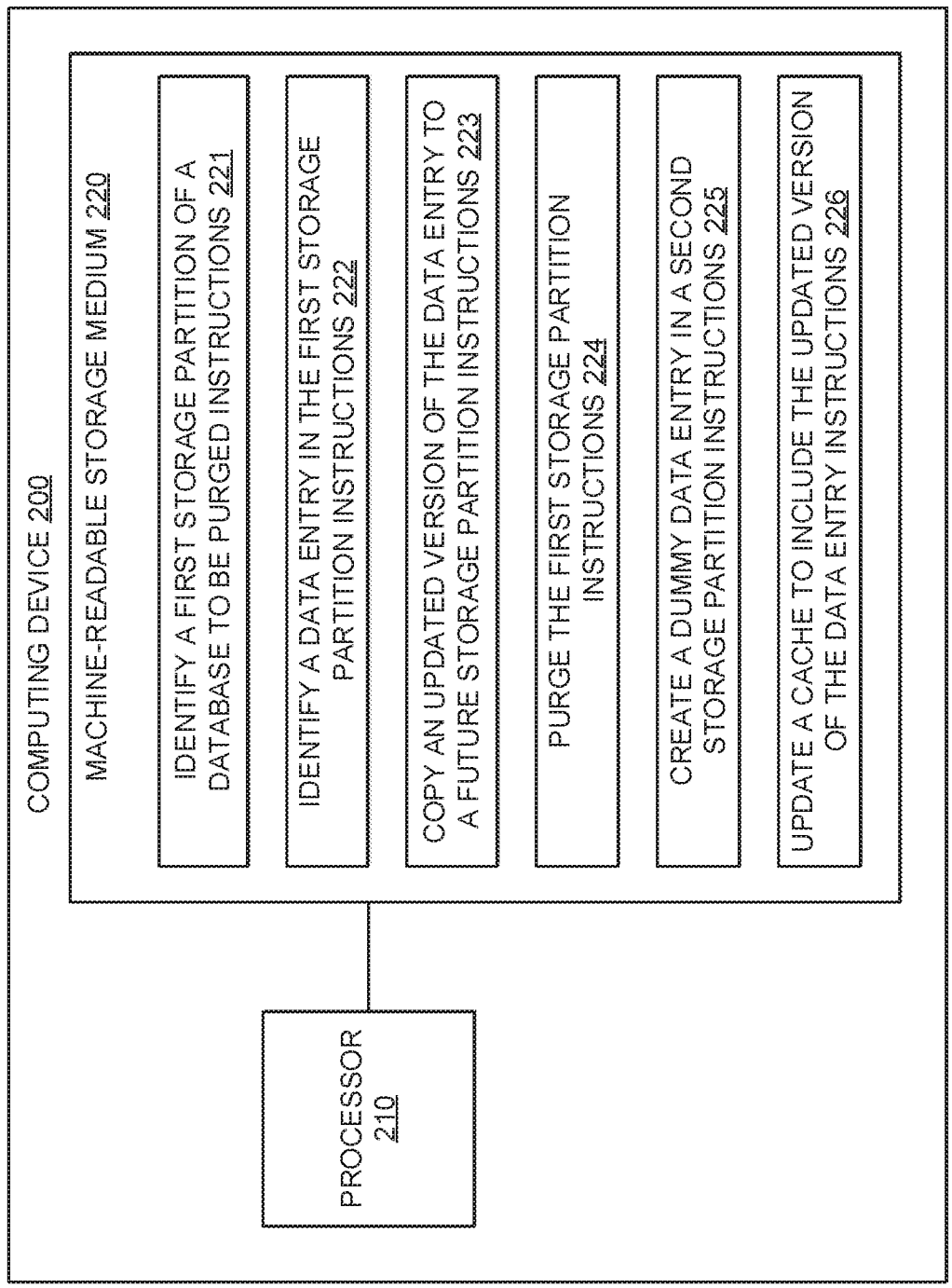
FIG. 2 is a block diagram of an example computing device for purging a storage partition of a database.

FIG. 2 shows a block diagram depicting an example computing device 200 for purging a storage partition of a database. Computing device 200 may be a server, cloud-based server, laptop computing device, a desktop computing device, an all-in-one computing device, a tablet computing device, a mobile phone, an electronic book reader, a network-enabled appliance such as a "Smart" television, and/or other electronic device suitable for the functions described herein. While computing device 200 is depicted as a single computing device, computing device 200 may, in some examples, include any number of integrated or distributed computing devices connected in a network.

Processor 210 may be at least one central processing unit (CPU), microprocessor, and/or other hardware device suitable for retrieval and execution of instructions stored in machine-readable storage medium 220. Processor 210 may fetch, decode, and execute program instructions 221, 222, 223, 224, 225, 226, and/or other instructions. In other examples or in addition to retrieving and executing instructions, processor 210 may include at least one electronic circuit comprising a number of electronic components for performing the functionality of at least one of instructions 221, 222, 223, 224, 225, 226, and/or other instructions.

Machine-readable storage medium 220 may be any electronic, magnetic, optical, or other physical storage device that contains or stores executable instructions. In some implementations, machine-readable storage medium 220 may be a non-transitory storage medium, where the term "non-transitory" does not encompass transitory propagating signals. Machine-readable storage medium 220 may be implemented in a single device or distributed across devices. Likewise, processor 210 may represent any number of processors capable of executing instructions stored by machine-readable storage medium 220. Processor 210 may be integrated in a single device or distributed across devices. Further, machine-readable storage medium 220 may be fully or partially integrated in the same device as processor 210, or it may be separate but accessible to that device and processor 210.

In one example, the program instructions may be part of an installation package. In this case, machine-readable storage medium 220 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 220 may include a hard disk, optical disk, tapes, solid state drives, RAM, ROM, EEPROM, or the like. The executable program instructions in machine-readable storage medium 220 are depicted as identify a first storage partition of a database to be purged instructions 221, identify a data entry in the first storage partition instructions 222, copy an updated version of the data entry to a future partition instructions 223, purge the first storage partition instructions 224, create a dummy data entry in a second storage partition instructions 25, and update a cache to include the updated version of the data entry instructions 226.

When executed by processor 210, instructions 221, 222, 223, 224, 225, and 226 may respectively cause computing device 200 to implement operations 110-150 of method 100 and/or operations 115-160 of method 200. Accordingly, computing device 200 identify a first storage partition of a database to be purged such as by identifying the oldest storage partition in the database, identify a data entry in the first storage partition to be copied such as by identifying a data entry in the first partition where a latest version of the data entry in the database is stored in the first partition, copy an updated version of the data entry to a future storage partition, purge the first storage partition, create a dummy data entry in a second storage partition which may be the second oldest partition in the database, and updating a cache to include the updated version of the data entry which may include querying the database to locate the dummy data entry.

The various components (e.g., processor 210, storage medium 220, and/or instructions 221-226) depicted in FIG. 2 may be coupled to at least one other component via a network, which may comprise any infrastructure or combination of infrastructures that enable electronic communication between the components. For example, a network may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 3:
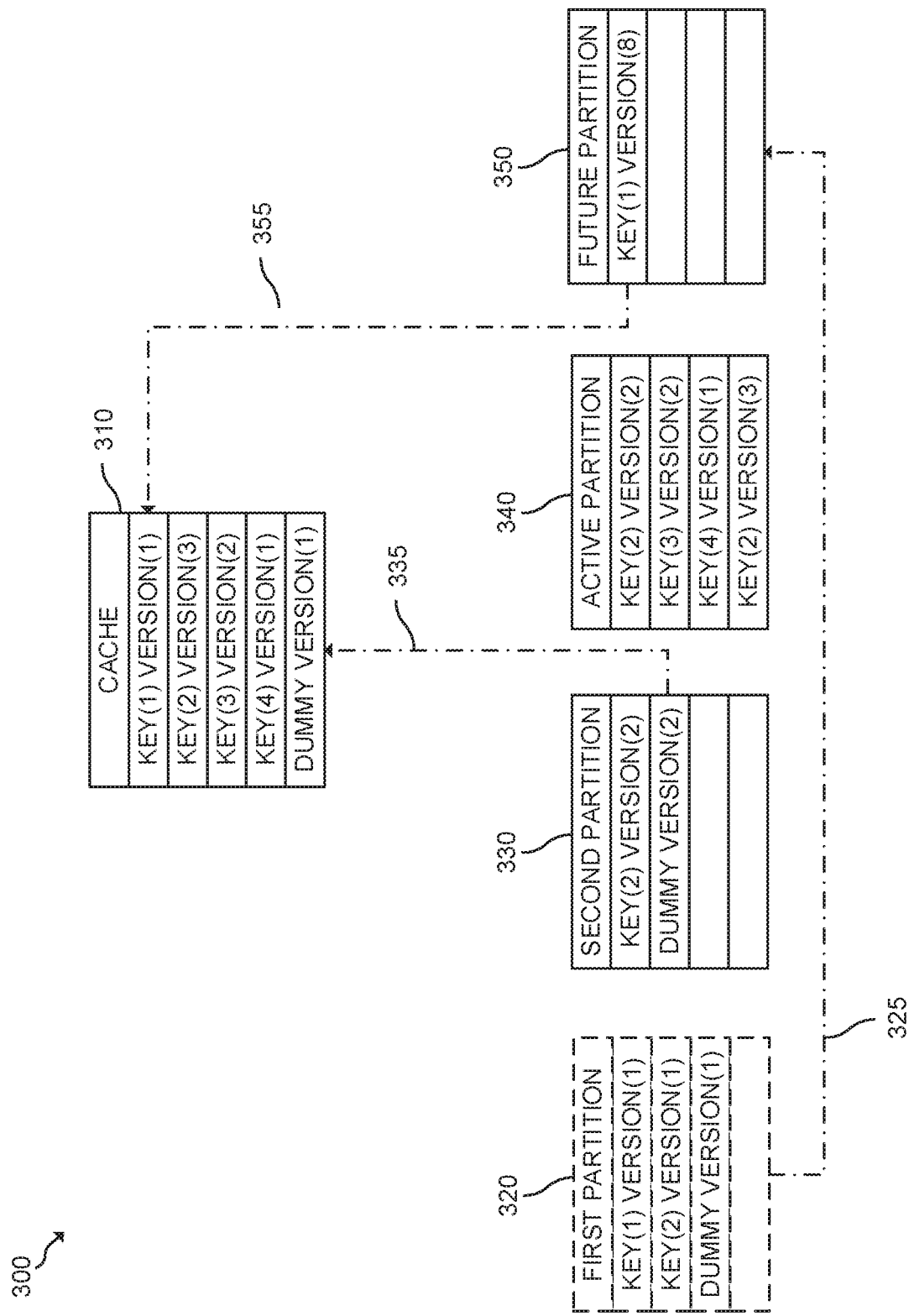
FIG. 3 is a block diagram illustrating an example operation of purging a storage partition of a database.

FIG. 3 illustrates an example operation 300 of purging a storage partition of a database. FIG. 3 may conceptually illustrate the operations of method 100, 150, and/or the instructions 221-226 of computing device 200 when executed by processor 210. For example, FIG. 3 conceptually illustrates storage partitions 320, 330, 340, and 350 of a columnar database, and cache 310 that stores the latest versions of data entries of the database. In FIG. 3, data entries are illustrated as keys. Cache 310 stores the latest versions of each key. For example, KEY(1) VERSION(1), KEY(2) VERSION(3), KEY(3) VERSION(2), KEY(4) VERSION(1), and DUMMY VERSION(1) are stored in cache 310 prior to the start of a purging process as described herein.

In operation 110 or 115, or by execution of instructions 221 by processor 210, a first storage partition 320 of a database to be purged may be identified. For example, storage partition 320 may be the oldest partition in the database. In operation 120 or 125, or by execution of instructions 222, a data entry in the first storage partition to be copied may be identified. For example, a data entry in the first partition where a latest version of the data entry in the database is stored in the first partition may be identified. For example, VERSION(1) is the latest version of KEY(1) in the database. Therefore, KEY(1) is identified to be copied. By contrast, the latest version of KEY(2) is found in storage partition 340 as KEY(2) VERSION(3). Therefore, KEY(2) is not identified for copying. DUMMY VERSION(1) is also stored in storage partition 320 because partition 320 is the oldest partition in the database.

In operation 130 or 135, or by execution of instructions 223, an updated version of the identified data entry may be copied to a future storage partition 350. For example, KEY(1) VERSION(8) is inserted into future partition 350. VERSION(8) may be used here merely to illustrate that it is an used future version, and could be any higher version number. Element 325 in FIG. 3 illustrates the copying of KEY(1) from first partition 320 to future partition 350. In operation 140 or 145, or by execution of instructions 224, first storage partition 320 may be purged, as illustrated by the dashed line used in FIG. 3. First storage partition 320 may be wiped clean in response to the latest versions of its data entries being copied to a future partition. Upon purging, first storage partition 320 may be an empty storage partition, and may be used for storing other data in the database, including as a future partition in future operations.

In operation 150 or 155, or by execution of instructions 225, a dummy data entry may be created in a second storage partition 330. For example DUMMY VERSION(2) is created in second storage partition 330 in response to purging of the first storage partition 320, which had included DUMMY VERSION(2). DUMMY VERSION(2) may include information about the destination future partition 350 to which KEY(1) VERSION(8) was copied. The second storage partition 330, in some examples, may be the second oldest storage partition of the database, and it may become the oldest storage partition of the database after the first storage partition is purged.

In operation 160, or by execution of instructions 226, cache 310 may be updated to include the updated version of the data entry that was copied. For example, as illustrated by element 355, cache 310 may be updated to include KEY(1) VERSION(8), which may replace the place of KEY(1) VERSION(1) in the cache 310. Accordingly, cache 320 stores the latest version of all of the data entries in the database. In some examples, cache 320 may be updated in response to the copying of KEY(1) from first partition 320 to future partition 350. Alternatively, updating the cache 310 may not occur automatically, but may occur as part of a cache updating process. For example, the cache 310 may periodically, in a process separate from the purging process, query the database to locate a dummy in the database, which in this example is DUMMY VERSION(2) in second partition 330. Upon finding the dummy, which identifies future partition 350, the cache 310 may be updated with the data entries in the future partition 350 (i.e., KEY(1) VERSION (8)), which are updated versions of the data entries copied from the first storage partition 320, which was purged. In this manner, cache 310 may be maintained to keep a record of which version of each data entry is the latest (i.e., most up-to-date) within the database.

The foregoing disclosure describes a number of examples for purging storage partitions of databases. The disclosed examples may include systems, devices, computer-readable storage media, and methods for purging partitions. For purposes of explanation, certain examples are described with reference to the components illustrated in FIGS. 1-3. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The terminology used herein is for the purpose of describing particular examples and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are used to distinguish one element from another unless stated otherwise or the context indicates otherwise. As used herein, the term "includes" means includes but not limited to, the term "including" means including but not limited to. The term "based on" means based at least in part on.

What is claimed is:

1. A method comprising:
   identifying, by a processor, a first table partition to be purged, wherein the first table partition is one of a plurality of table partitions of a database table, and wherein the plurality of table partitions are separated according to time ranges;
   identifying, by the processor, a database entry in the first table partition, wherein the identified database entry is to be copied to a different table partition of the database table;
   copying, by the processor, an updated version of the identified database entry to a future table partition of the database table;
   purging, by the processor, the first table partition; and
   in response to a purge of the first table partition, creating, by the processor, a dummy database entry in a second table partition of the database table, wherein the dummy database entry stores an identifier for the future table partition, and wherein the second table partition is a second oldest table partition of the database table.

2. The method of claim 1, wherein identifying the database entry in the first table partition to be copied comprises identifying a database entry in the database table that has a latest version stored in the first table partition.

3. The method of claim 1, wherein identifying the first table partition to be purged comprises identifying an oldest table partition of the database table.

4. The method of claim 1, wherein the second table partition becomes an oldest table partition of the database table after the first table partition is purged.

5. The method of claim 1, wherein the future table partition is an empty table partition before the identified database entry is copied to the future table partition.

6. The method of claim 1, further comprising updating a cache to include the updated version of the identified database entry, wherein the cache stores latest versions of each database entry in the database table.

7. The method of claim 6, wherein updating the cache comprises querying the database table to locate the dummy database entry and updating the cache with database entries stored in the future table partition.

8. The method of claim 1, wherein the database table is a columnar database table.

9. The method of claim 1, wherein the database table comprises a log-structured merge-tree data structure.

10. The method of claim 1, comprising copying updated versions of a plurality of database entries identified in the first table partition to a plurality of future table partitions of the database table, and wherein the dummy database entry stores identifiers for the plurality of future table partitions of the database table.

11. A non-transitory machine-readable storage medium encoded with instructions executable by a processor of a computing device to:
identify a first table partition of a database table to be purged by identifying an oldest table partition of the database table, wherein the first table partition is one of a plurality of table partitions of the database table, and wherein the plurality of table partitions are separated according to time ranges;
identify a database entry in the first table partition, wherein a latest version of the identified database entry in the database table is stored in the first table partition, and wherein the identified database entry is to be copied to another table partition;
copy an updated version of the database entry to a future table partition of the database table;
purge the first table partition; and
create a dummy database entry in a second table partition of the database table, wherein the dummy database entry stores an identifier for the future table partition, and wherein the second table partition is a second oldest table partition of the database table and becomes the oldest table partition of the database table after the first table partition is purged.

12. The non-transitory machine-readable storage medium of claim 11, wherein the future table partition is an empty table partition at the time the identified database entry is copied to the future table partition.

13. The non-transitory machine-readable storage medium of claim 11, further comprising instructions to update a cache to include the updated version of the identified database entry, wherein the cache stores latest versions of each database entry in the database table.

14. The non-transitory machine-readable storage medium of claim 13, further comprising instructions to query the database table to locate the dummy database entry and to update the cache with database entries stored in the future table partition.

15. The non-transitory machine-readable storage medium of claim 11, wherein the database table is a columnar database table.

16. The non-transitory machine-readable storage medium of claim 11, wherein the database table comprises a log-structured merge-tree data structure.

17. The non-transitory machine-readable storage medium of claim 11, further comprising instructions to copy updated versions of a plurality of database entries identified in the first table partition to a plurality of future table partitions of the database table, and wherein the dummy database entry stores identifiers for the plurality of future table partitions.

18. A computing device comprising a processor to:
identify a first table partition of a database table to be purged by identifying an oldest table partition of the database table, wherein the first table partition is one of a plurality of table partitions of the database table, and wherein the plurality of table partitions are separated according to time ranges;
identify a database entry in the first table partition, wherein a latest version of the identified database entry in the database table is stored in the first table partition, and wherein the identified database entry is to be copied;
copy an updated version of the identified database entry to a future table partition of the database table;
update a cache to include the updated version of the identified database entry;
purge the first table partition;
create a dummy database entry in a second table partition of the database table, wherein the dummy database entry stores an identifier for the future table partition, and wherein the second table partition is a second oldest table partition of the database table and becomes the oldest table partition of the database table after the first table partition is purged; and
query the database table to locate the dummy database entry and update the cache with database entries stored in the future table partition, wherein the cache stores the latest versions of each database entry in the database table.

19. The computing device of claim 18, wherein the future table partition is an empty table partition at the time the identified database entry is copied to the future table partition.

20. The computing device of claim 18, wherein the database table is a columnar database table that comprises a log-structured merge-tree data structure.

* * * * *